Oct. 31, 1967

J. F. HUFF 3,349,983

CONTOUR POSITIONING DEVICE

Filed June 22, 1964

INVENTOR.
JOSEPH F. HUFF

BY

Philip J. McFarland

ATTORNEY

Oct. 31, 1967  J. F. HUFF  3,349,983
CONTOUR POSITIONING DEVICE
Filed June 22, 1964
2 Sheets-Sheet 2

INVENTOR.
JOSEPH F. HUFF
BY
Philip J. McFarland
ATTORNEY

3,349,983
CONTOUR POSITIONING DEVICE
Joseph F. Huff, 72 Washington St., Hyde Park, Mass. 02136
Filed June 22, 1964, Ser. No. 376,958
3 Claims. (Cl. 228—7)

This invention pertains generally to work holding apparatus and particularly to apparatus of such type which is adapted to moving the periphery of an asymmetrically shaped work piece past a work station at a constant speed.

It is known in the art that the problem of movably supporting asymmetric work pieces so that such pieces may be easily and efficiently subjected to many commonly desired fabrication processes is extremely difficult. The problem is especially difficult when, in addition to being asymmetric, the work piece is relatively thin and is irregularly shaped. In such a circumstance, there is no known apparatus which is well enough adapted to the solution of the holding problem to be useful in production processes. Consequently, it is customary to have highly skilled artisans fabricate thin, irregularly shaped objects by hand.

Some attempts have been made to solve the problem of providing work-holding apparatus for non-circular work pieces. For example, it is known that, as taught by H. W. Mitchell in U.S. Patent No. 2,313,393, a rotational movement may be imparted to a non-circular work piece by gear of a shape similar to the work piece. Such an expedient is, however, of little use when the work-piece to be held has either sharp corners or reverse curves. Further, such an expedient is of little use when it is necessary that the speed of the work-piece past a work station must be held at a constant speed. Obviously, non-circular gearing must, as stated by patentee, be permitted to vary in speed or else it will jam. Still further, it is evident that if specially shaped gears must be used, the requirement that such gears correspond with the shape of the work-piece poses great practical problems.

Therefore it is a primary object of this invention to provide improved work-holding apparatus particularly well adapted to positioning asymmetrically shaped work-pieces.

Another object of this invention is to provide improved work-holding apparatus by means of which an asymmetrically shaped work-piece may be moved at a constant speed past a work station.

Still another object of this invention is to provide improved work-holding apparatus which is easily adapted to work-pieces of different shapes yet permits many operations to be accomplished.

These and other objects of this invention are attained generally by providing work-holding apparatus which consists of a slidably mounted carriage, rotatably supporting a template which has at least a magnetizable periphery of the same general shape as the outline of a work-piece, and a work-piece fabricated from sheet stock. A magnetic drive shaft rotated by an electric motor, contacts the magnetizable periphery of the template. The template, the work-piece and the drive shaft are so proportioned that the centerline of the magnetic drive shaft and the edge of the work-piece coincide. Thus, as the magnetic drive shaft is rotated, the rotatable template and the work-piece are rotated and the slidably mounted carriage move to compensate for changes in the contour of the work-piece. As a result, the periphery of the work-piece moves at a constant speed past the centerline of the magnetic drive shaft. For a more complete understanding of this invention reference is now made to the following detailed description of this invention and to the attached drawings, in which:

Figure 1:
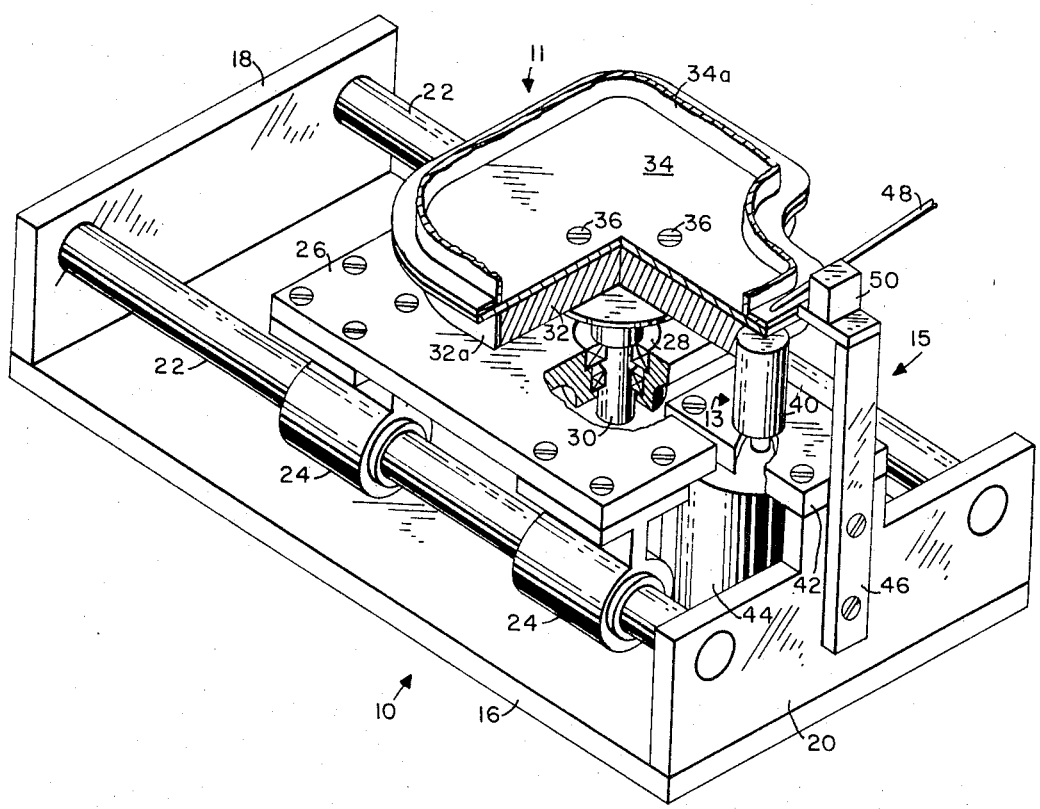
FIG. 1 is an isometric view of a preferred embodiment of the invention.

Referring now to FIG. 1, the preferred embodiment of my invention may be seen to comprise a base assembly 10 on which a work positioning assembly 11, a driving assembly 13 and a tool positioning assembly 15 are mounted. The base assembly 10 consists of a bed plate 16, upstanding side members 18, 20 integrally affixed to such plate in any convenient manner, and a pair of parallel guide rods 22 running between the side members 18, 20.

The work positioning assembly 11 is made up of a pair of bushings 24 slidably mounted on each of the guide rods 22 and integrally attached to a carriage 26. The latter element, in turn, is formed to support a thrust bearing 28 in which a shaft 30 is mounted. A template 32, similar in shape to a work-piece 34 (which is not per se a part of my invention) is mounted in any convenient manner on the shaft 30. As indicated on FIG. 1, the body of the template 32 may be fabricated from a material as wood, it being necessary only that its periphery, for reasons that will become clear, be magnetizable. This object, as is well known, may be accomplished by affixing, in any convenient manner, a band 32a of a magnetic material (such as a ribbon of carbon steel or any other magnetic material to the periphery of the body of the template 32). It should be noted here in passing, if desired, the template 32 could be fabricated entirely from a magnetic material. It should also be noted that the manner in which the work-piece 34 is attached to the template 32 is not a part of this invention and, therefore, the illustrated way in which the required attachment is here effected by screws 36 should not be deemed to be restrictive.

The driving assembly 13 comprises a drive shaft 40 supported in a bearing (unnumbered) in a plate 42 affixed to the side member 20, as shown, and driven by an electric motor 44. The drive shaft 40 is fabricated from a permanent magnetic material and is disposed so as to be in frictional contact with the periphery of the template 32. The radius of the drive shaft 40 and the size of the template 32 are so proportioned wtih respect to the size of the work-piece 34 that the vertical axis of the drive shaft 40 corresponds with the periphery of the work-piece 34, whatever the rotational position of the latter may be.

Consideration of the tool positioning assembly 15, is necessary for a full understanding of the concepts of the invention. Many different kinds of tools and many different mounts therefor obviously may be used to position the working edge or point of the tool coincidentally with the vertical axis of the drive shaft 40. For example, as shown in FIG. 1, when it is desired to seam weld the work-piece 34 to the mating flange (unnumbered) of a part 34a, then the tool positioning assembly 15 need only be a standard 46, attached to the side member 20 in any convenient manner, and adapted to support a welding rod 48 so that the tip thereof coincides with the joint between the work-piece 34 and the flange at a point substantially on the extension of the vertical axis of the drive shaft 40. A conventional welding rod controller 50 may be provided to maintain the proper spacing of the tip of the welding rod 48 from the joint being welded and to supply welding energy. It is obvious, however, that torch welding may also be carried out in the illustrated case in place of the illustrated resistance welding.

Having now described the elements making up the preferred embodiment of my invention, its mode of operation will now be described. It may be seen that, as the drive shaft 40 is rotated by the electric motor 44, frictional and magnetic forces are set up between the drive shaft 40 and the periphery of the template 32. These forces together operate to cause the template 32, the work-piece 34 and the part 34a to rotate on the shaft 30. The magnetic attraction between the drive shaft 40 and the template 32 maintains the periphery of the latter in contact with the mating surface of the drive shaft 40. Consequently, as successive points on the periphery of the template 32 move into contact with the drive shaft 40, the entire work positioning assembly 11 is forced to move on the guide rods 22 to accommodate for the differing dimensions of the template 32. Since the relative dimensions of the template 32 and the work-piece 34 have been chosen as indicated hereinbefore, points on the periphery of the work-piece 34 move over the center line of the drive shaft 40. It has been found that, when such a condition obtains, the speed at which successive points on the periphery of the work-piece 34 move past the centerline of the drive shaft 40 is substantially constant. It follows, then, that, if an operation such as welding is to be carried out, this latter characteristic is of extreme importance.

Figure 2:
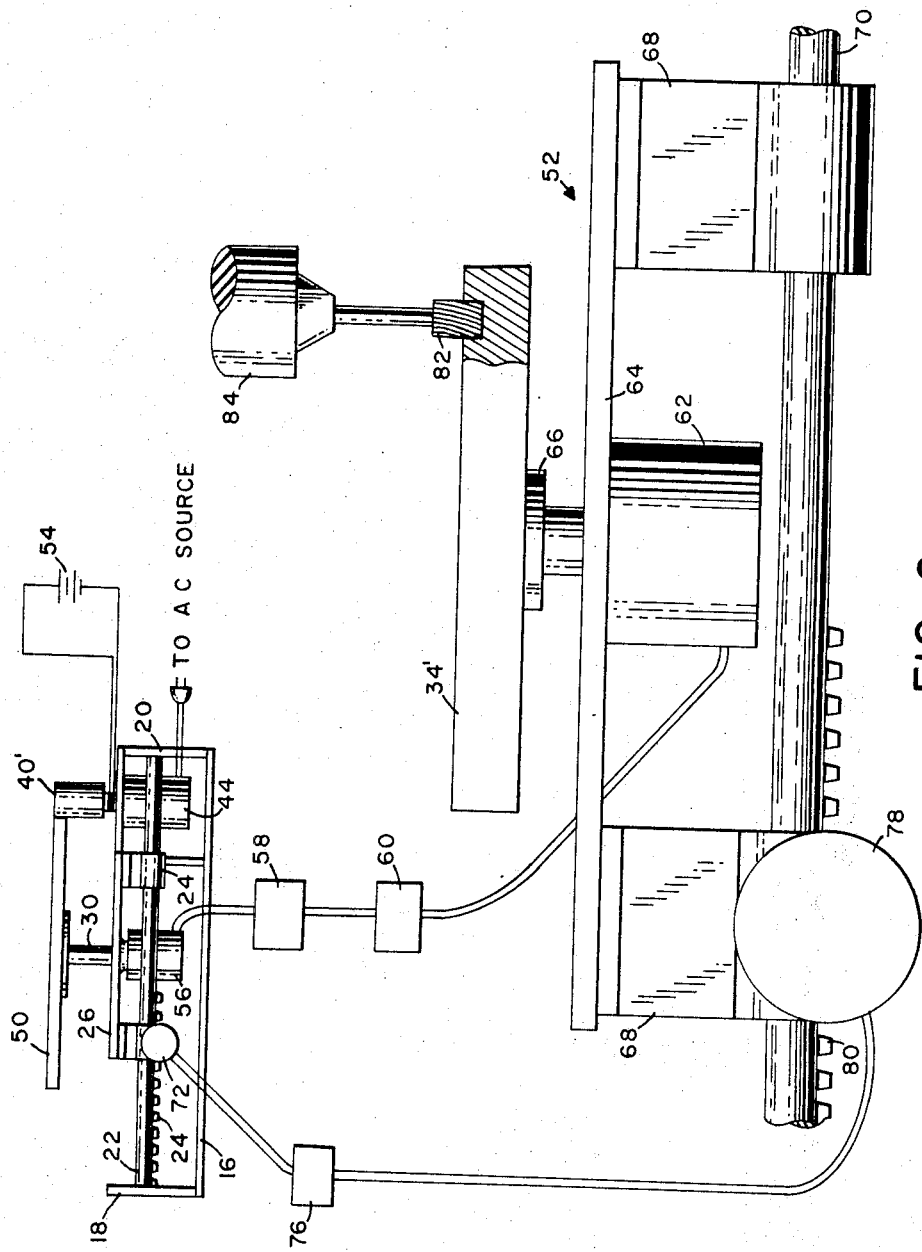
FIG. 2 is a front elevation, partly in section and somewhat simplified, of a second embodiment of the invention.

Turning now to FIG. 2, an embodiment of this invention is shown wherein the template and the work-piece may be separated. In additon, the embodiment in FIG. 2 illustrates practical modifications in the driving assembly shown in FIG. 1. Thus, FIG. 2 illustrates a system wherein positional information derived from a template 50 is converted into an electrical signal to control a work positioning assembly 52. The template 50 is similar to the template 32 in that it is shaped similarly to the work-piece 34'. There is, however, in this embodiment no necessity that the two bear any predetermined ratio in size. As a matter of fact, it is preferred that the template 50 be much smallert han the work-piece 34'. The periphery of the template 50 and the surface of the drive shaft 40' are here shown to be roughened to increase the frictional forces therebetween. Further, it may be seen that the drive shaft 40' is the armature of an electromagnet (unnumbered) which is energized by a battery 54. A selsyn transmitter 56 is mounted on the carriage 26 so as to be actuated by the shaft 30 to produce a signal indicative of the rotational position of the template 50. Such a signal is fed through a selsyn receiver 58, a servo amplifier 60 to a servo motor 62. The shaft of the servo motor 62 is mounted on a carriage 64, the shaft of such motor being rotatably mounted therein and supporting a work-piece mounting flange 66 to which the work-piece 34' is affixed. The carriage 64 in turn is mounted, as by depending bushings 68, on a pair of parallel rods 70. Linear movement of the template 50 is converted into a signal by means of a potentiometer 72 coacting with a rack 74 formed on one of the rods 22. This signal is transmitted to a servo amplifier 76 to control a servo motor 78 mounted on one of the bushings 68 and coacting with a rack 80 formed on one of the rods 70. It will be noted here that the circuits for transmitting rotational information must have a 1:1 ratio, but that the circuits for transmitting information of the linear movement of the template 50 must have a ratio corresponding to the relative size of the work-piece 34' to the template 50. Both such conditions are easily met with conventional position signal transmitting circuits. An end mill 82 driven by a drill press 84 completes the assembly shown in FIG. 2. It is evident that the end-mill 82 must be positioned at the proper point on the periphery of the work-piece 34. This end may be easily attained by making index marks (not shown) on both the template 50 and the work-piece 34' and rotating the two until the index mark on the template 50 is at the point of contact between the template 50 and the drive shaft 40' and the index mark on the work-piece 34' is at the point of contact between the work-piece 34' and the end-mill 82.

It should be noted that it is not essential to the proper operation of this invention that a carriage mounted on guide bars be used. That is, when the template is relatively small, the required movement of the center of rotation of the template is, in turn, small and the carriage may be replaced by a simpler mechanism. For example, under such conditions the template may be rotatably mounted on a pivoted bar. Other changes may also be made without departing from my inventive concepts, as providing matching tapers on the template and the drive shaft to increase the frictional forces acting between those two parts. Still another change of the nature being discussed is to make the periphery of the template from a non-magnetic ribbon stock and using a magnetic back-up roller spring-biased toward the drive shaft. In view of the foregoing it is felt that the invention should not be restricted to its disclosed embodiments, but rather should be limited only by the spirit and scope of the appended claims.

What is claimed is:
1. Apparatus for supporting an irregularly-shaped work-piece of sheet material and for moving the periphery thereof at a constant speed past a tool, comprising:
   (a) a template having an outline similar to, but smaller than, the outline of the work-piece, such template having a magnetizable periphery;
   (b) means for mounting, in an overlying relationship, the work-piece on the template so that the work-piece overlaps the template by a fixed distance;
   (c) means, including a magnetic drive shaft contacting the magnetic periphery of the template, for rotating the template and the work-piece, the radius of such shaft being equal to the fixed distance;
   (d) a carriage, said template and said work-piece being rotatably mounted on said carriage;
   (e) a pair of guide rods fixedly disposed relative to said magnetic drive shaft;
   (f) a plurality of bushings fixed to said carriage and mounted on said guide rods; and
   (g) a tool disposed to operate on the periphery of the work-piece at successive points thereon as such points pass the center of rotation of the drive shaft.

2. Apparatus as in claim 1 wherein the periphery of the template and the coacting surface of the magnetic shaft are roughened to increase the frictional forces therebetween.

3. Apparatus as in claim 2 wherein the magnetic drive shaft is the armature of an electromagnet.

References Cited
FOREIGN PATENTS
| | | |
|---|---|---|
| 176,750 | 9/1922 | Great Britain. |
| 220,670 | 8/1924 | Great Britain. |
| 538,579 | 3/1957 | Canada. |

JOHN F. CAMPBELL, *Primary Examiner.*

WHITMORE A. WILTZ, CHARLIE T. MOON,
*Examiners.*

MARTIN L. FAIGUS, *Assistant Examiner.*